United States Patent

Kohri et al.

[11] Patent Number: 5,959,744
[45] Date of Patent: Sep. 28, 1999

[54] RECORDING APPARATUS AND RECORDING METHOD

[75] Inventors: Shinichiro Kohri, Kawasaki; Toru Maeda, Mitaka; Masanori Momose, Tokyo; Naomi Nakamura, Kawaguchi; Yasushi Morimoto, Yokohama; Fumio Shoji, Abiko, all of Japan

[73] Assignee: Canon Kabushiki Kaisha, Tokyo, Japan

[21] Appl. No.: 08/814,105

[22] Filed: Mar. 10, 1997

[30] Foreign Application Priority Data

Mar. 11, 1996 [JP] Japan ..................... 8-080520
Mar. 3, 1997 [JP] Japan ..................... 9-061749

[51] Int. Cl.⁶ .................................. H04N 1/387
[52] U.S. Cl. ..................... 358/450; 358/296; 358/400; 358/448; 358/449; 358/488; 358/498
[58] Field of Search ........................ 358/450, 400, 358/296, 508, 404, 448, 449, 488, 498

[56] References Cited

U.S. PATENT DOCUMENTS

| | | | |
|---|---|---|---|
| 5,428,460 | 6/1995 | Kabeya et al. | 358/451 |
| 5,585,939 | 12/1996 | Yoshida | 358/438 |
| 5,589,948 | 12/1996 | Itezono | 358/449 |
| 5,592,307 | 1/1997 | Murai | 358/468 |
| 5,721,627 | 2/1998 | Kamiya | 358/496 |
| 5,739,828 | 4/1998 | Moriyama et al. | 347/9 |

Primary Examiner—Leo H. Boudreau
Assistant Examiner—Kanji Patel
Attorney, Agent, or Firm—Fitzpatrick, Cella, Harper & Scinto

[57] ABSTRACT

A recording apparatus records image data without wastefully consuming record sheets. Received image data are combined in a sub-scan direction, and if a sub-scan length of the combined image data does not exceed a sub-scan length of a record sheet loaded in the apparatus, the combined data is recorded on one record sheet. When main scan lengths of image data of a plurality of pages combined are different from each other, the image data are reduced to comply to a record sheet of a minimum main scan length. When resolutions of image data of a plurality of pages combined are different from each other, the resolutions are converted to a minimum resolution and they are recorded.

36 Claims, 11 Drawing Sheets

RECORDING APPARATUS AND RECORDING METHOD

BACKGROUND OF THE INVENTION

1. Field of the Invention

The present invention relates to a recording apparatus.

2. Related Background Art

As a recording apparatus, a facsimile apparatus has been known. In a prior art facsimile apparatus, when received image data is recorded, one page of image data is recorded on one record sheet.

However, in the prior art facsimile apparatus, even if a data size of one page of image data does not reach one record sheet, only one page of image data is recorded on one record sheet, so that a blank area is created and the record sheet is wasted. Further, in a receiving station, it is difficult to output received image data in a desired form.

SUMMARY OF THE INVENTION

It is an object of the present invention to provide a recording apparatus which records image data without wastefully consuming record sheets.

DETAILED DESCRIPTION OF THE PREFERRED EMBODIMENTS

Embodiment 1

Figure 1:
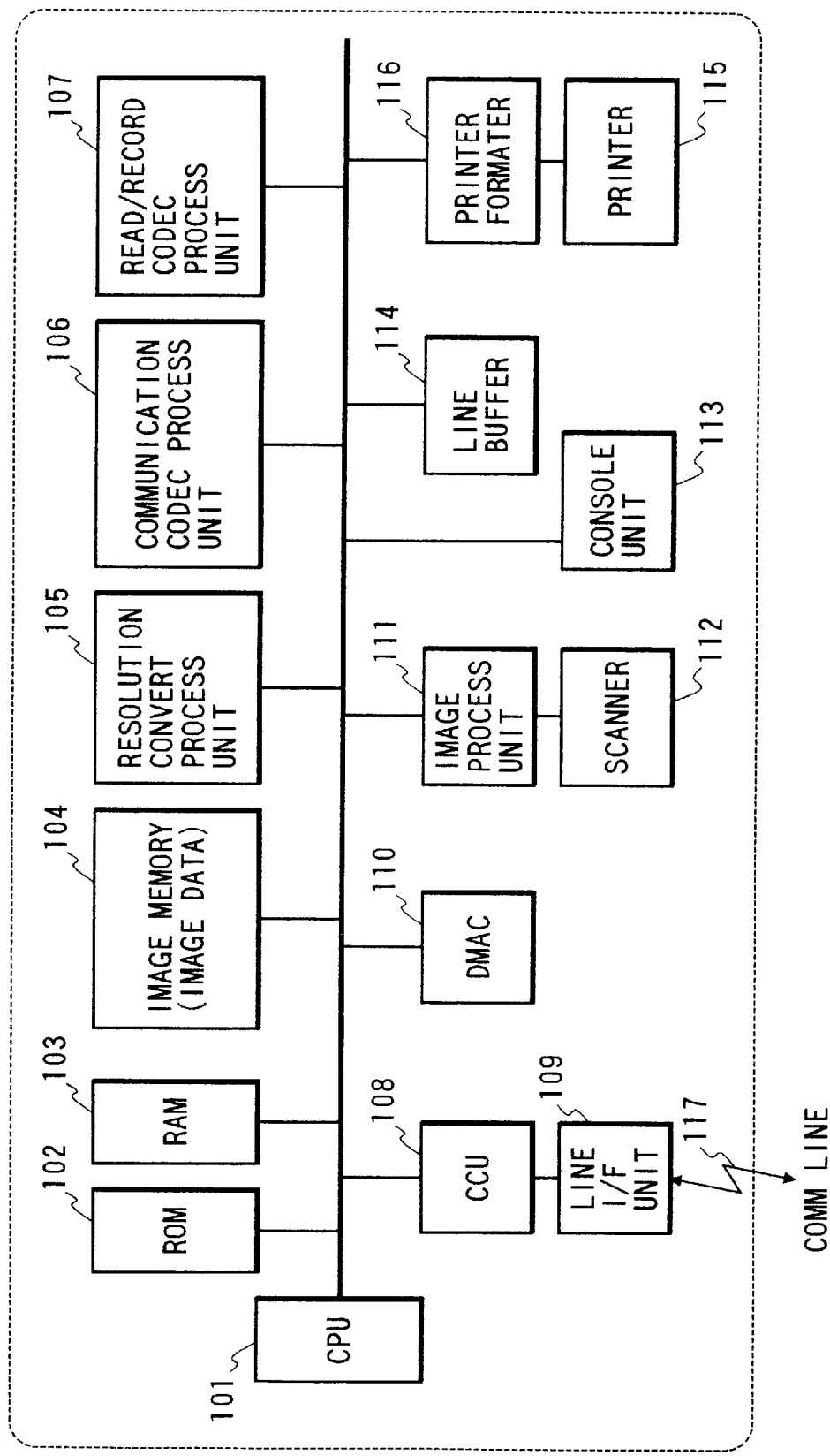
FIG. 1 shows a block diagram of a configuration of a facsimile apparatus.

An embodiment of the recording apparatus of the present invention is now explained. The recording apparatus of the present embodiment is applied to a facsimile apparatus. FIG. 1 shows a block diagram of a configuration of the facsimile apparatus.

A CPU 101 is a system control unit which controls the overall system. A ROM 102 stores a control program of the CPU 101. A RAM 103 comprises a static RAM (SRAM) and stores program control variables (parameters). The RAM 103 stores settings and management data registered by an operator and has a work area for use in the execution of a program by the CPU 101. An image memory 104 comprises a dynamic RAM (DRAM) and stores image data.

A resolution conversion processing unit 105 conducts a resolution conversion control such as millimeter-inch resolution conversion of raster data. A communication codec processing unit 106 and a read/record codec processing unit (read/record codec) 107 code and decode image data handled in the facsimile apparatus.

A communication control unit (CCU) 108 controls a communication protocol of the facsimile apparatus. A line I/F unit 109 has an interface to a communication line 117 such as an integrated services digital communication network (ISDN) or a public telephone network (PSTN) and controls the communication line 117.

A direct memory access controller (DMAC) 110 conducts data transfer between memories or between the communication line and the memory directly without the intervention of the process by the CPU 101. A scanner 112 comprises a contact type image sensor (CS) and a document sheet feed mechanism. The scanner 112 optically reads a document sheet and converts it to electrical image data. The image data is corrected by an image processing unit 111 and outputted as highly fine image data.

A console unit 113 comprises an LCD and a keyboard, and displays various messages and allows various entries by the operator. A line buffer 114 is used for the transfer control of the image data. A printer 115 records a received image and file data (text data) on a record sheet. A printer formatter 116 decodes a printer description language and converts it to image data when the file data received from a workstation through an interface, not shown, is printed.

The printer 115 can accommodate a plurality of record sheet cassettes in which record sheets of different sizes may be set.

A record sheet size of the cassette loadable to the printer 115 includes the following. For a record sheet size of A4 width (which is a main scan length of the record sheet to be described later), sizes A5, letter, A4 and legal in the ascending order. For a record sheet of A3 width, size A3. For record sheet size of B4 width, sizes B5 and B4 in the ascending order.

Prior to the recording of the image data recorded in the memory, the CPU 101 detects the record sheet sizes of the respective cassettes loaded to the printer 115. Based on the detected record sheet size, the CPU 101 prepares a loaded cassette table arranged in the ascending order of the record sheet size and stores it in the RAM 103.

When the CPU 101 executes the record sheet selection process and the combination process to be described later, it determines the record sheet size to be used based on the loaded cassette table.

Figure 2:
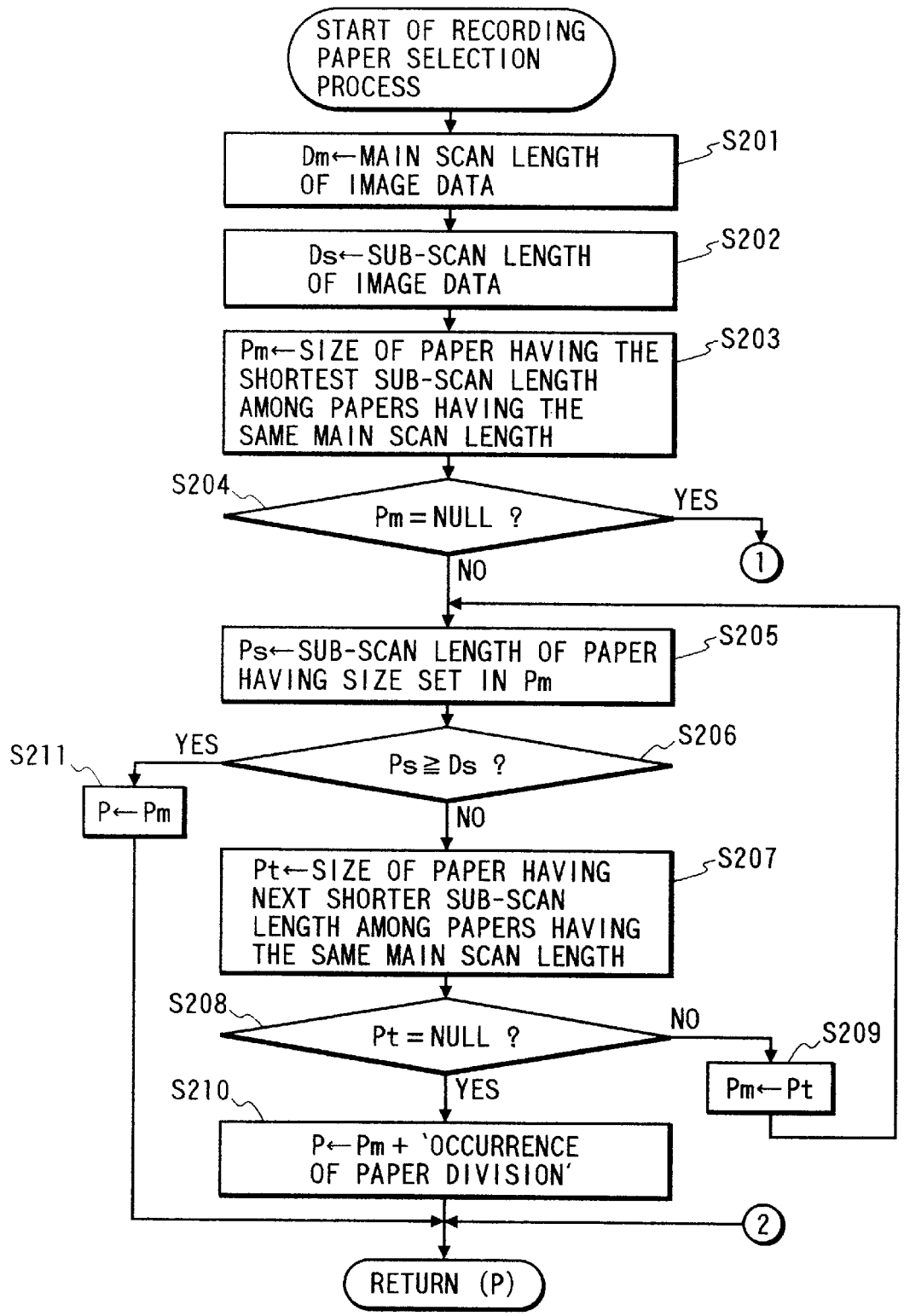
FIG. 2 shows a flow chart of a record sheet selection process.
Figure 3:
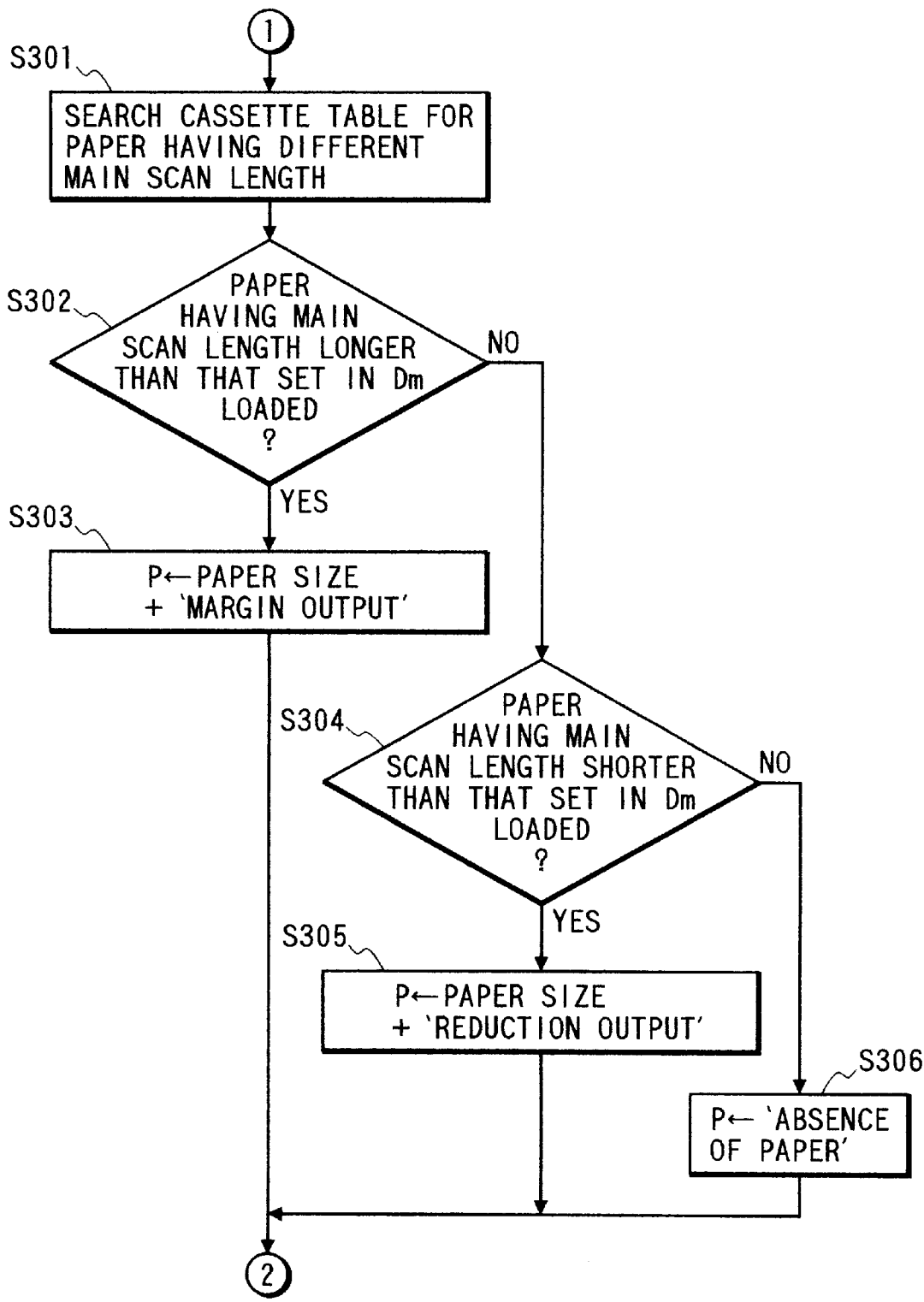
FIG. 3 shows a flow chart of the record sheet selection process which is a continuation from FIG. 2.

First, a record sheet selection process executed during the combined record process to be described later is explained. FIGS. 2 and 3 show flow charts of the record sheet selection process. Dm is a parameter (control variable) which contains a main scan length of one page of image data to be recorded. Ds is a parameter which contains a sub-scan length of one page of data to be recorded. Pm is a parameter which contains a record sheet size to be used when the record sheet size is selected. Ps is a parameter which contains a sub-scan length of the record sheet. Pt is a parameter which contains a sub-can length of the record sheet. P is a parameter which contains a record sheet size and a record status which are results of the record sheet selection process. The content of the parameter P is informed to a host process (the combination process to be described later) after the return of the process. The image data to be recorded is stored in the image memory 104. The main scan length and the sub-scan length of the image data of each page are stored in the RAM 103.

The main scan length of one page of image data to be recorded is first stored in the parameter Dm (step S201). Then, the sub-scan length of the one page of image data to be recorded is stored in the parameter Ds (step S202). By referring the loaded cassette table, the size of the record sheet having the shortest sub-scan length among the recorded sheets having the same main scan length as the parameter Dm is stored in the parameter Pm (step S203).

Whether the record sheet size stored in the parameter Pm is empty or not, that is, whether the record sheet having the same main scan length as that of the image data is set or not is determined (step S204). If the parameter Pm is empty, that is, if the record sheet having the same main scan length as the image data is not set, the process proceeds to a step S301. In the step S301, the record sheet having the main scan length which is not equal to that of the image data is searched from the loaded cassette table, and whether the record sheet having a larger main scan length than the main scan length set in the parameter Dm is loaded in the apparatus or not is determined (step S302).

If the record sheet having the larger main scan length than the main scan length set in the parameter Dm is loaded in the apparatus, the record sheet size and a state to output to the record sheet having the larger main scan length than the main scan length of the image data (blank output state) are stored in the parameter P (step S303) and the process returns from the record sheet selection process. On the other hand, in the step S302, if the record sheet having the larger main scan length than the main scan length set in the parameter Dm is not loaded in the apparatus, whether a record sheet having a smaller main scan length than the main scan length set in the parameter Dm is loaded or not is determined (step S304).

In the step S304, if the record sheet having the smaller main scan length than the main scan length set in the parameter Dm is loaded in the apparatus, the record sheet size and a state to output the image data in a reduced form (reduced output state) are stored in the parameter P (step S305), and the process returns from the record sheet selection process. In the step S304, if the record sheet having the main scan length set in the parameter Dm is not loaded in the apparatus, the record sheet none is set in the parameter P (step S306) and the process returns from the record sheet selection process.

On the other hand, in the step S204, if the parameter Pm is not empty, the sub-scan length of the record sheet size is stored in the parameter Pm (step S205) and the magnitudes of the parameter Ps and the parameter Ds are compared (step S206). If the parameter Ps is not smaller than the parameter Ds, that is, if the sub-scan length of the record sheet size is not smaller than the sub-scan length of the image data, the record sheet size of the parameter Pm is stored in the parameter P (step S211) and the process returns from the record sheet selection process.

In the step S206, if the parameter Ps is smaller than the parameter Ds, that is, if the sub-scan length of the record sheet size is smaller than the sub-scan length of the image data, the size of the record sheet having the next shorter sub-scan length among the record sheets having the same main scan length as that of the parameter Dm is stored in the parameter Pt (step S207).

Whether the record sheet size stored in the parameter Pt is empty or not, that is, whether other record sheet having the same main scan length as that of the image data is loaded in the apparatus or not is determined (step S208).

If the parameter Pt is empty, that is, if the record sheet to be next compared is not present, the parameter Pm and a state of not recordable on one record sheet (record sheet division state) are stored in the parameter P (step S210) and the process returns from the record sheet selection process. On the other hand, in the step S208, if the parameter Pt is not empty, the parameter Pt is set in the parameter Pm (step S209) and the process of the steps S205 et seq. is continued.

Figure 4:
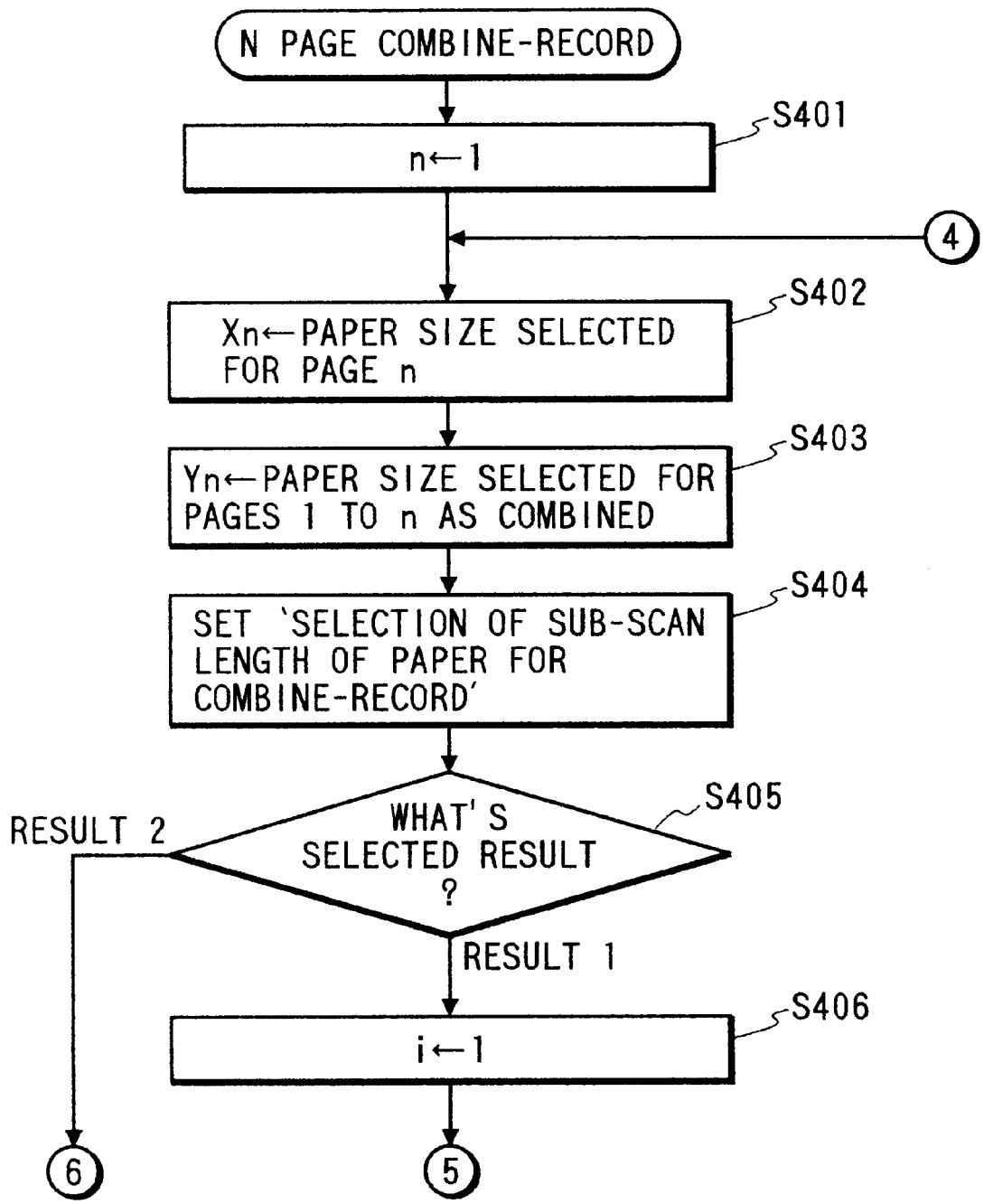
FIG. 4 shows a flow chart of a combined record process in the facsimile apparatus.
Figure 5:
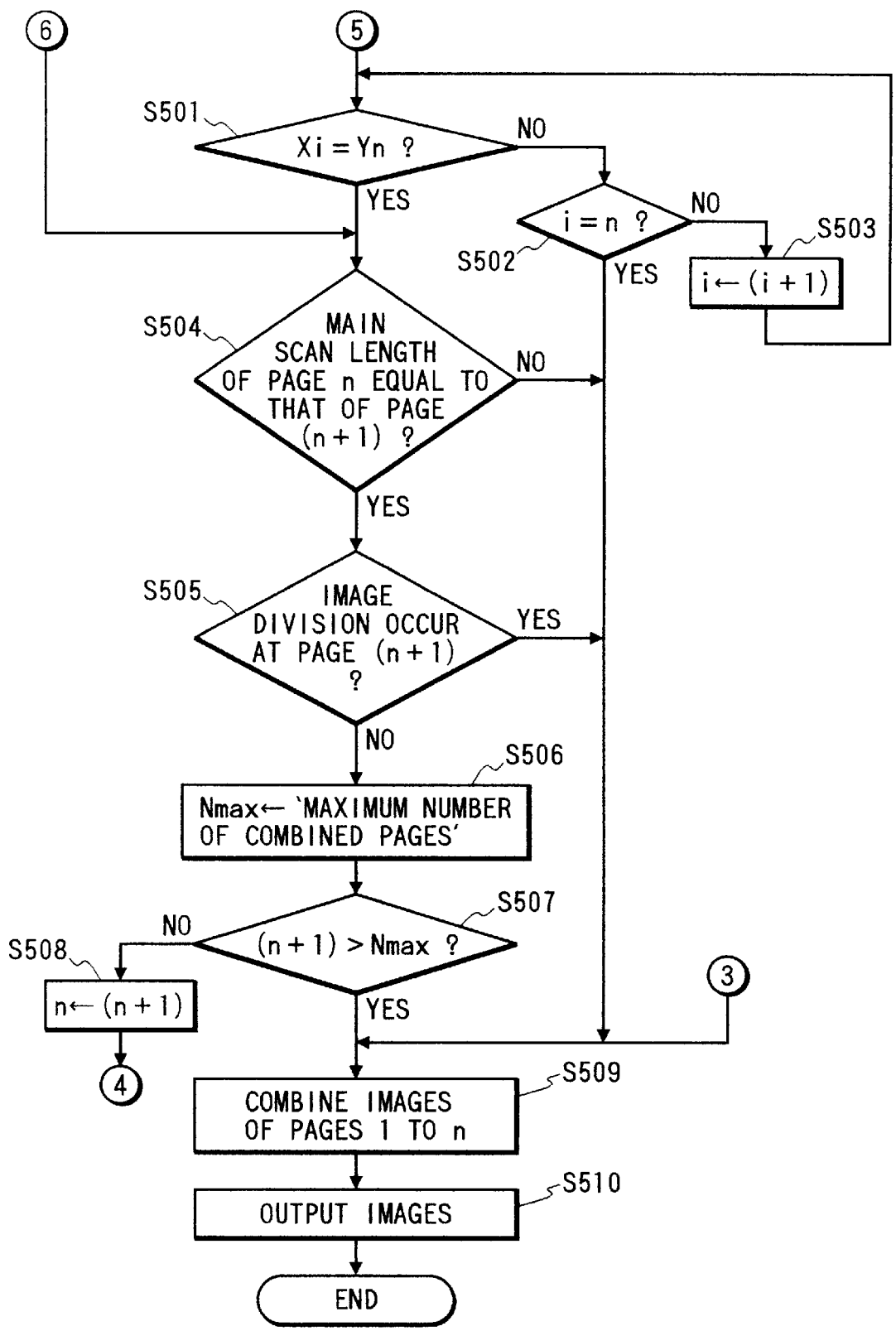
FIG. 5 shows a flow chart of the combined record process in the facsimile apparatus which is a continuation from FIG. 4.
Figure 6:
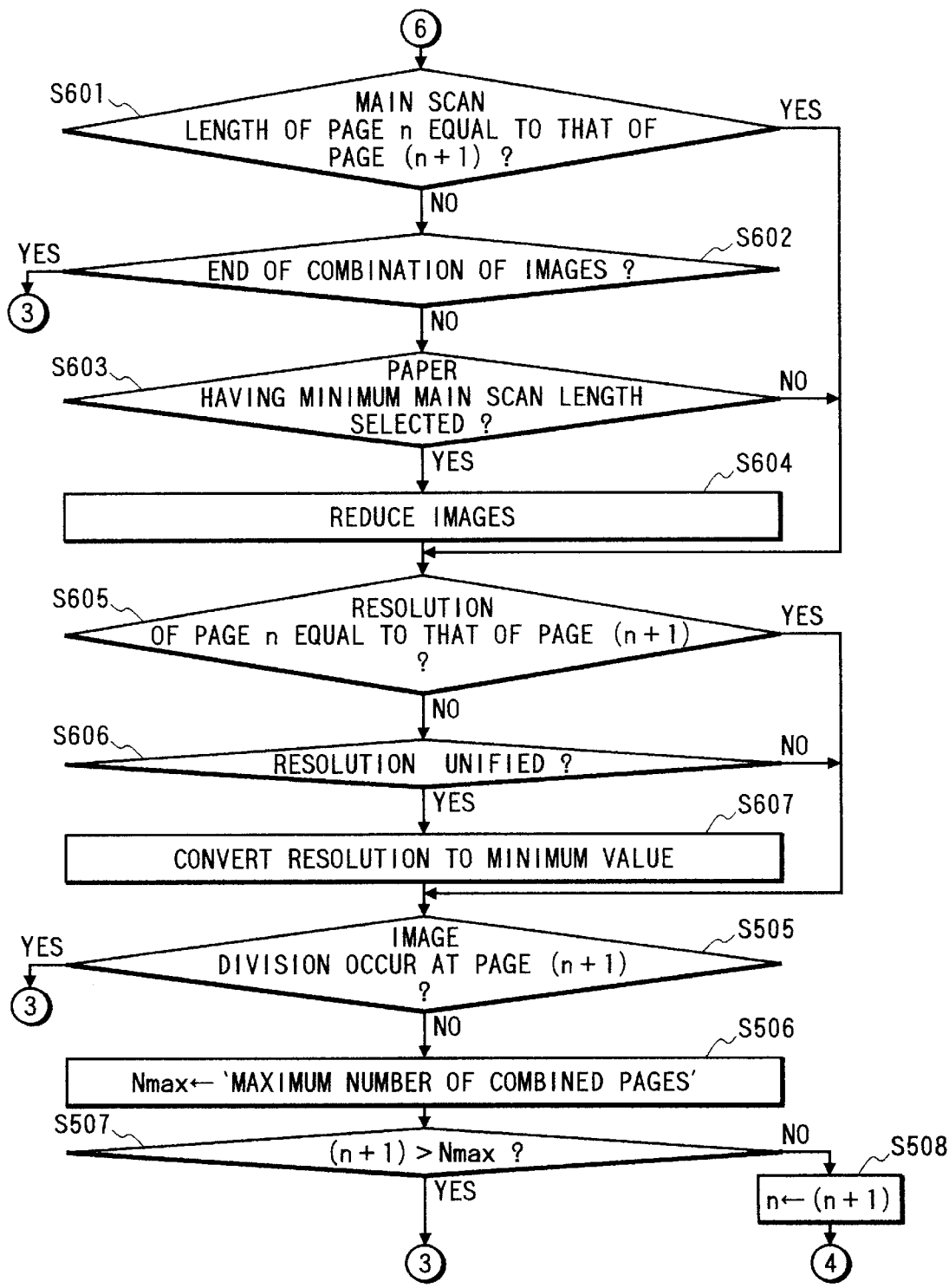
FIG. 6 shows a flow chart of an Embodiment 2.

FIGS. 4 and 5 show flow charts of the combined record process in the facsimile apparatus. The number of combined image data n is a parameter which contains the number of combined data when the image data are combined. A parameter Xn contains a result of the selection of the record sheet which is optimum to record the n-th page image data. A parameter Yn contains a result of the execution of the record sheet selection of the image data having the image data of pages 1 to n are combined. In the combined record process of FIGS. 4 and 5, the number of combined image data n is first initialized to 1 (step S401). The record sheet selection process is conducted for the n-th page and the selection result is set in the parameter Xn (step S402). The record sheet selection process is executed for the image data having pages 1 to n combined and the selection result is set in the parameter Yn (step S403).

Figure 7:
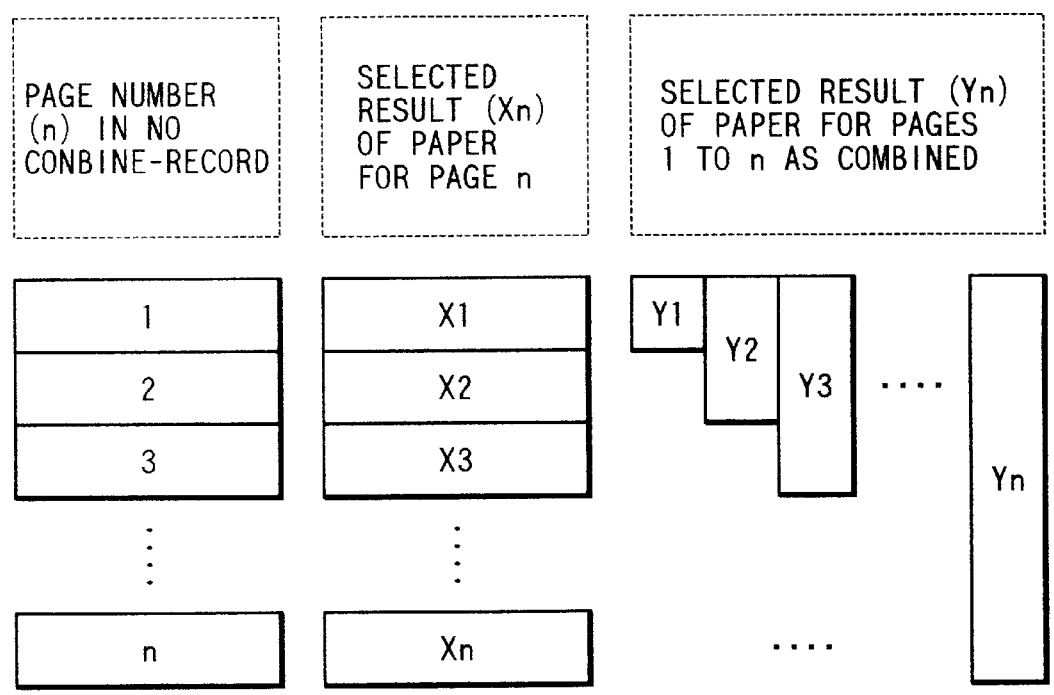
FIG. 7 illustrates the selection of a sub-scan length of a record sheet on which the combined record is made.

Then, the sub-scan length of the record sheet on which the combined record is made is selected (step S404). The selection result is either a result by the sub-scan length of the record sheet by the record sheet selection process of the image data (selection result 1) or a result by the sub-scan length of the record sheet loaded in the apparatus (selection result 2). FIG. 7 illustrates a case where the sub-scan length of the record sheet on which the combined record is made is selected. Parameters therefor are shown below:

Record Sheet Sub-scan Length Selection of Combined Record is Selection Result 1

When the following relation:

$$((X1 = Yn)V(X2 = Yn)V \cdots V(Xn = Yn)) = 1$$

AND no sheet division

AND $n \leq$ (maximum number of combined pages)

is no longer met, pages 1 to (n−1) are combination-recorded on one record sheet.

Record Sheet Sub-scan Length Selection of Combined Record is Selection Result 2

When the following relation:

no sheet division

AND n≦(maximum number of combined pages)

is no longer met, page 1 to (n−1) are combination-recorded on one record sheet.

In the combined record for the selection result 1, the parameter Yn and the parameter Xn are compared, and if even the same parameters do not exist even one pair, the combined record is not conducted and the record sheet indicated by the parameter Xn is selected for recording. Even when the record sheet selection results are same, if the sheet division occurs or the maximum number of combined pages is exceeded, the combined record is not conducted.

In the combined record for the selection result 2, the images are combined unless the sub-scan length of the combined images exceeds the sub-scan length of the record sheet previously loaded in the apparatus. Namely, a weight is put on the parameter Yn rather than the parameter Xn.

When the selection result 1 is detected in a step S405, a parameter i is initialized to 1 (step S406). The parameter i contains the number of pages for the comparison of Xn and Yn for the image data of pages 1 to n.

After the execution of the record sheet selection of the image data of page i, whether the parameter Xi and the parameter Yi indicate the same selection result or not is determined (step S501). If they are not the same selection result, the parameter i is compared with n to determine whether the process has been completed for all pages or not (step S502). If the comparison result indicates that both are same, the images of pages 1 to n are recorded on one record sheet (steps S509 and S510) and the process is terminated. On the other hand, in the step S502, if the comparison results indicates that they are different, the parameter i is incremented by one (step S503) and the process is continued from the step S501.

If the comparison result in the step S501 indicates that the selection results are same, whether the main scan length of the n-th page and the main scan length of the page (n+1) are equal or not is determined (step S504). If the main scan lengths are not equal, the process proceeds to a step S509. If they are equal, the process proceeds to a step S505.

In the step S505, the image data of the page (n+1) is combined, and whether the sub-scan length of the combined image data exceeds the sub-scan length set previously in the apparatus or not. If it exceeds the sub-scan length, the images of the pages 1 to n is recorded on one record sheet (steps S509 and S510) and the process is terminated. In the step S505, if the division information is included in Yn, the process proceeds to the step S509. On the other hand, in the step S505, if the sub-scan length is not exceeded, whether the number of pages (n+1) of the combined image data exceeds a maximum number of pages Nmax of the image data to be combined registered in the apparatus or not is determined (steps S506 and S507).

In the decision of the step S507, if the maximum number of pages Nmax is exceeded, the images of the pages 1 to n are recorded on one record sheet (steps S509 and S510) and the process is terminated. On the other hand, if the maximum number of pages Nmax is not exceeded, the number of coupled image data n is incremented by one (step S508) and the process is continued from the step S402.

Figure 8:
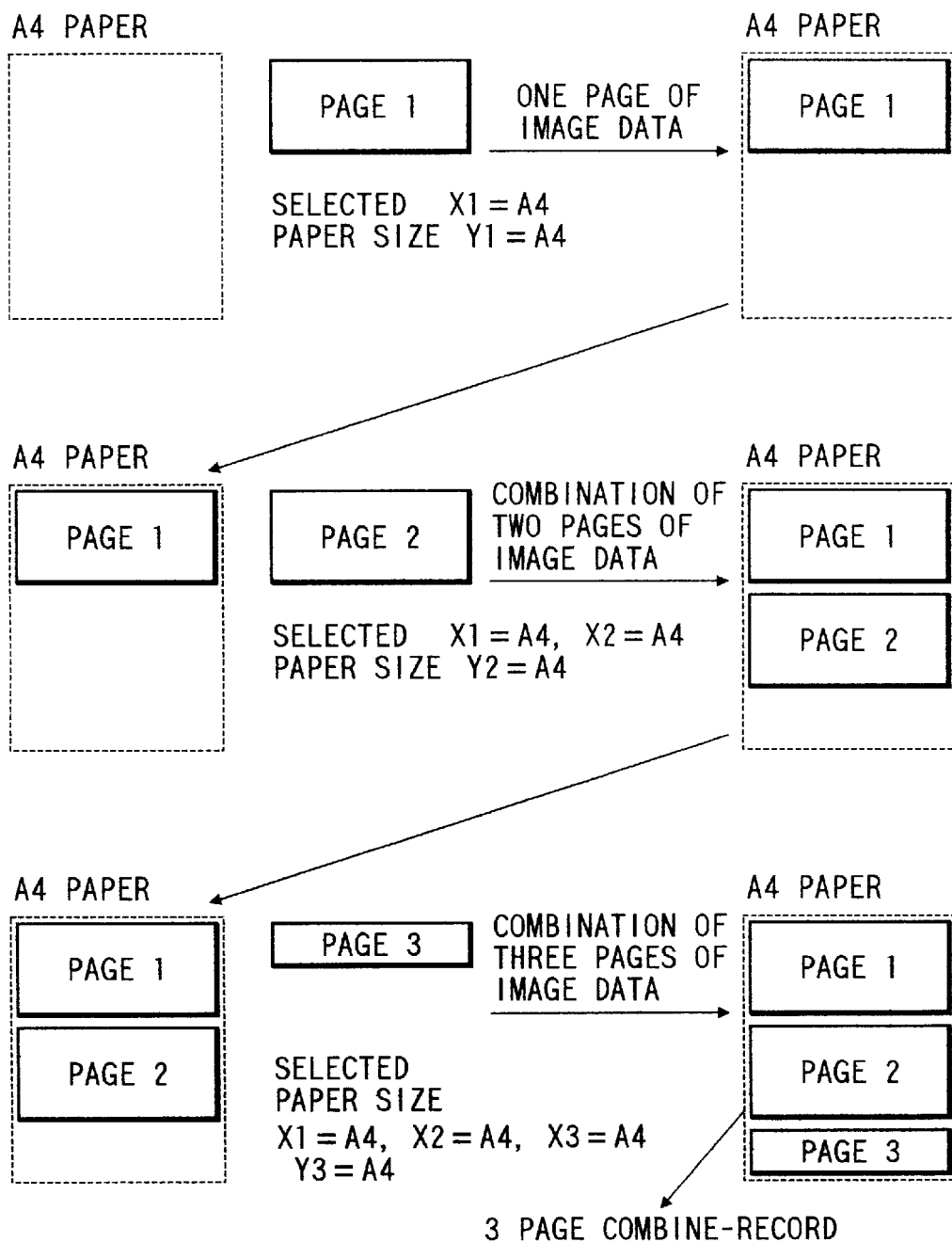
FIG. 8 illustrates the combined record process when a record sheet size set in the apparatus is only the size A4 and image data to be recorded is A5 short side×3 pages.

Referring to FIGS. 8, 9, 10 and 11, the selection results of the sub-scan length of the record sheet are shown. The selection result of the record sheet for which the combined record is made follows the sub-scan length of the record sheet by the record sheet selection process of the image data. FIG. 8 illustrates the combined record process when the size of the record sheet loaded in the apparatus is only A4 and the image data to be recorded is the A5 short side×3 pages. The image data of the page 1 is read and the record sheet selection is executed so that it is A4 and the parameter X1 is the size A4. The record sheet selection process for the image data having pages 1 to 1 combined is A4 and the parameter Y1 is thus size A4. Accordingly, from this result, X1=Y1 is met and the image of the page 1 can be combined.

Then, the image data of the page 2 is read and the record sheet selection process is executed so that it is the size A4 and the parameter X2 is the size A4. On the other hand, the record sheet selection result for the image data having the pages 1 to 2 combined is the size A4 and the parameter Y2 is the size A4. Accordingly, from this result, X1=Y2 is met and the image of the page 2 can be combined.

Then the image data of the page 3 is read and the record sheet selection process is executed so that it is the size A4 and the parameter X3 is the size A4. The record sheet selection result for the image data having the pages 1 to 3 combined is the size A4 and the parameter Y3 is the size A4. Accordingly, from this result, X1=Y3 is met and the image of the page 3 can be combined. In this manner, the three-page combined record is executed.

Figure 9:
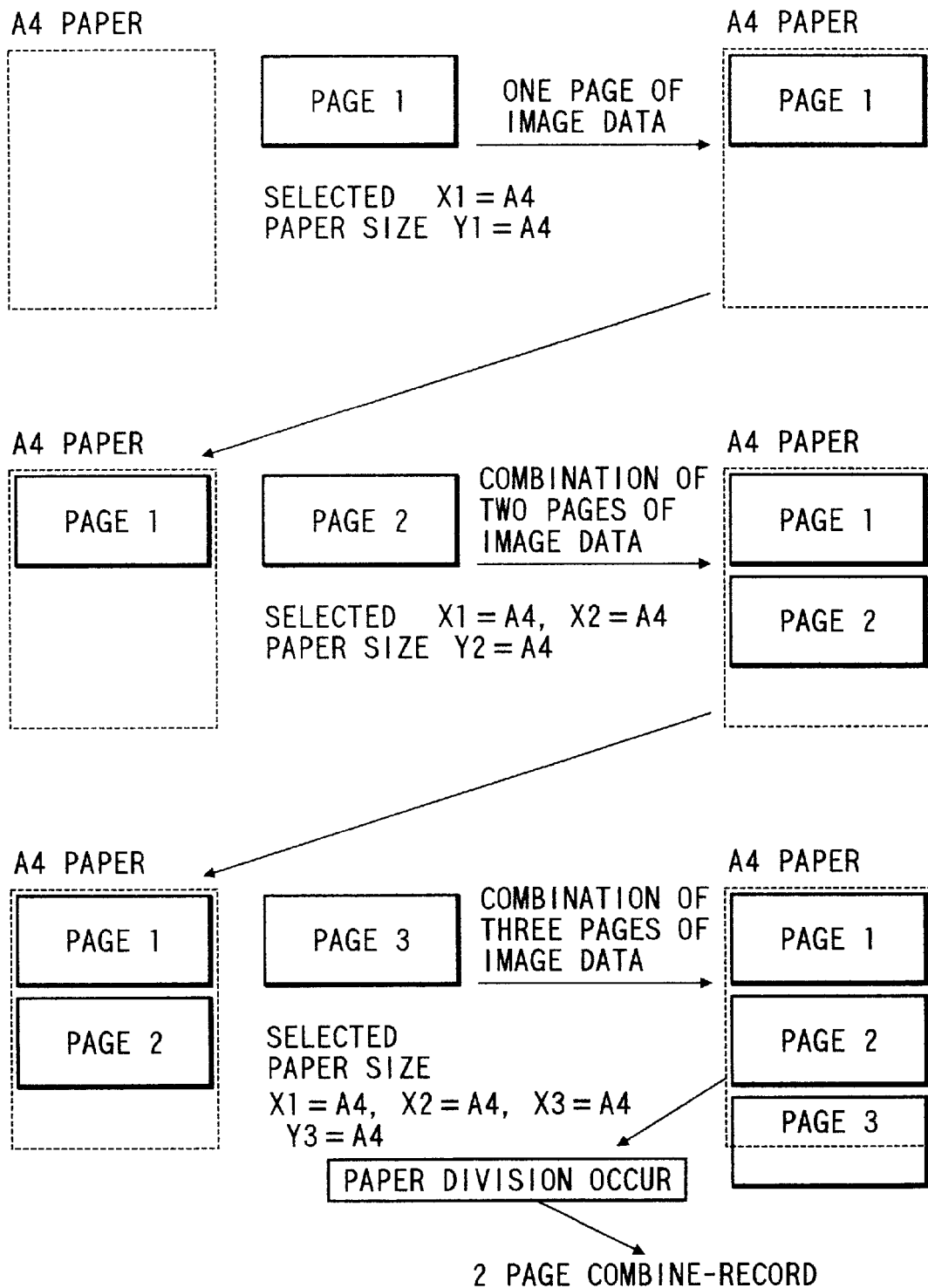
FIG. 9 illustrates the combined record process when the record sheet size set in the apparatus is only the size A4 and image data to be recorded is A5 short side×3 pages.

FIG. 9 illustrates the combined record process when the size of the record sheet loaded in the apparatus is only the size A4 and the image data to be recorded is A5 short side×3 pages. The image data of the page 1 is read and the record sheet selection process is executed so that it is the size A4 and the parameter X1 is the size A4. On the other hand, the record sheet selection result for the image data having the page 1 to 1 combined is the size A4 and the parameter Y1 is A4. Accordingly, from this result, X1=Y1 is met and the image of the page 1 can be combined.

Then, the image data of the page 2 is read and the record sheet selection process is executed so that it is the size A4 and the parameter X2 is the size A4. On the other hand, the record sheet selection result having the pages 1 to 2 combined is the size A4 and the parameter Y2 is the size A4. Accordingly, from this result, X1=Y2 is met and the image of the page 2 can be combined.

Then, the image data of the page 3 is read and the record sheet selection process is executed so that it is the size A4 and the parameter X3 is the size A4. On the other hand, the record sheet selection process for the image data having the pages 1 to 3 combined is the A4 long side and the parameter Y3 is the A4 long side. Accordingly, X1≠Y3 and the image of the page 3 cannot be combined. In this manner, the two-page combined record is executed.

Figure 10:
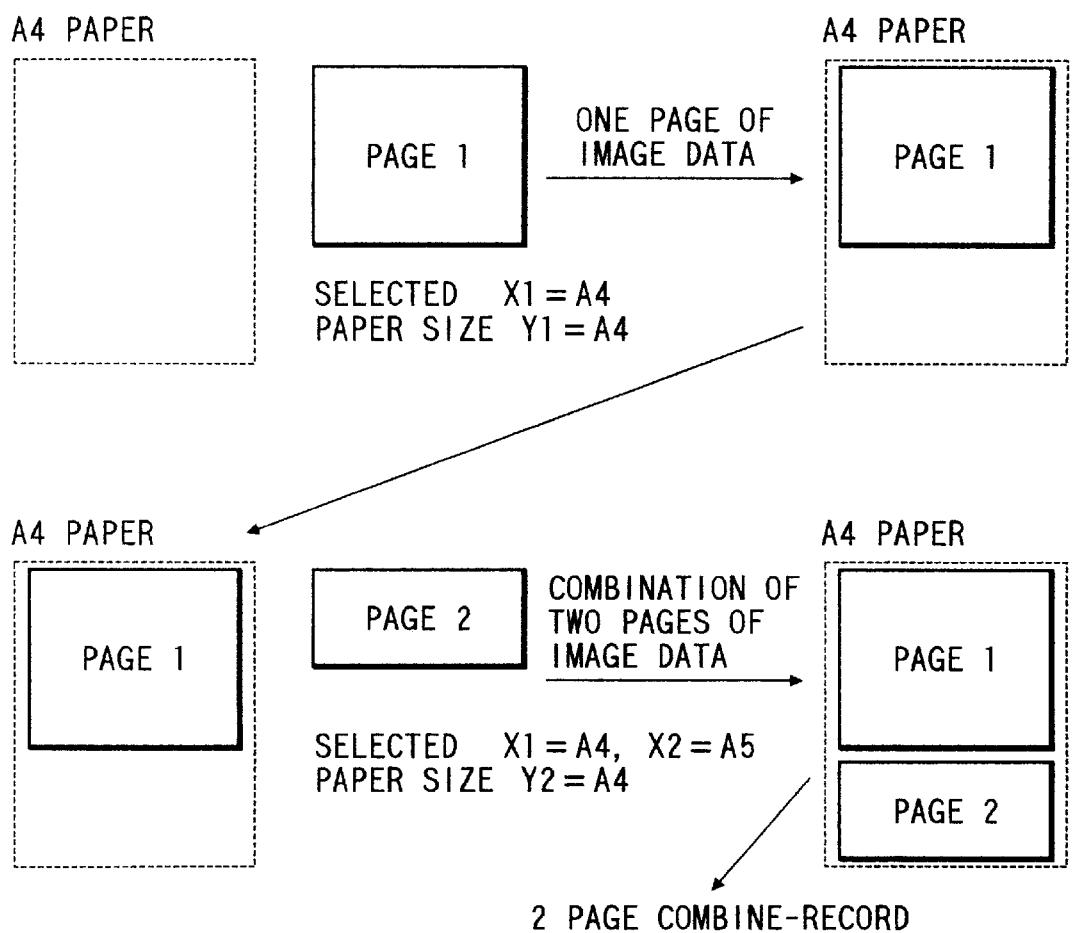
FIG. 10 illustrates the combined record process when the record sheet sizes set in the apparatus are A5 and A4 and the image data to be recorded is A4 short side×1 page and A5 short side×1 page.

FIG. 10 illustrates the combined record process when the sizes of the recorded sheets loaded in the apparatus are the size A5 and the size A4 and the image data to be recorded are A4 short side×1 page and A5 short side×1 page. The image data of the page 1 is read and the record sheet selection process is executed so that it is the size A4 and the parameter X1 is the size A4. On the other hand, the record sheet selection result for the image data having page 1 to 1 combined is the size A4 and the parameter Y1 is the size A4. Accordingly, from this result, X1=Y1 is met and the image of the page 1 can be combined.

Then, the image data of the page 2 is read and the record sheet selection process is executed so that it is the size A5 and the parameter X2 is the size A5. On the other hand, the record sheet selection result for the image data having the pages 1 to 2 combined is the size A4 and the parameter Y2 is the size A4. Accordingly, X1=Y2 is met and the image of the page 2 can be combined. In this manner, the two-page combined record is executed.

Figure 11:
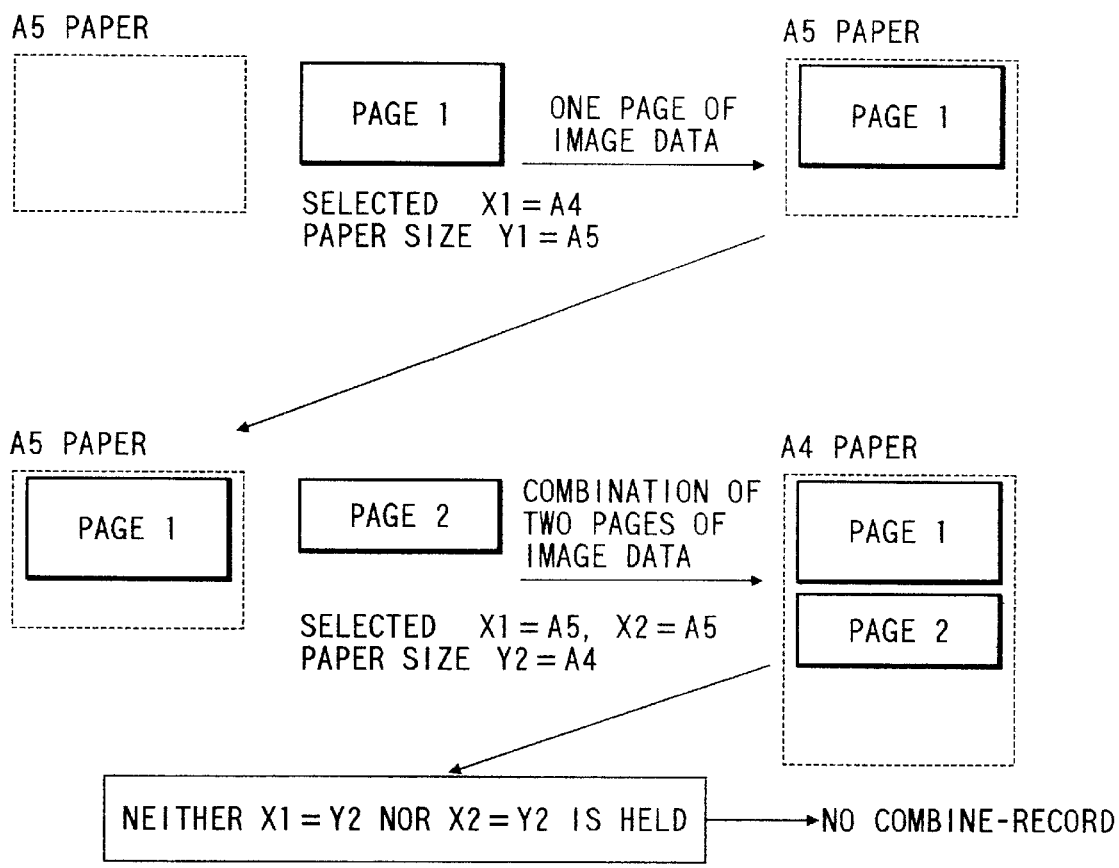
FIG. 11 illustrates the combined record process when the record sheet sizes set in the apparatus are A5 and A4 and the image data to be recorded is A5 short side×2 pages.

FIG. 11 illustrates the combined record process when the sizes of the record sheets loaded in the apparatus are the size A5 and the size A4 and the image data to be recorded is A5 short side×2 pages.

The image data of the page 1 is read and the record sheet selection process is executed so that it is the size A5 and the parameter X1 is the size A5. On the other hand, the image data having the page 1 to 1 combined is the size A5 and the parameter Y5 is the size A5. From this result, X1=Y1 is met and the image of the page 1 can be combined.

Then, the image data of the page 2 is read and the record sheet selection process is executed so that it is the size A5 and the parameter X2 is the size A5. On the other hand, the record sheet selection result having the pages 1 to 2 combined is the size A4 and the parameter Y2 is the size A4.

From this result, $X1 \neq Y2$ and $X2 \neq Y2$, and the image of the page 2 cannot be combined. Accordingly, the combined record is not executed and the normal record is made.

Embodiment 2

The like elements to those of the Embodiment 1 are designated by the like numerals and the explanation thereof is omitted, and only the difference from the Embodiment 1 is explained below.

When the result in the step S405 is selection result 2, whether the main scan length of the page n and the main scan length of the page (n+1) are equal or not is determined (step S601). If the main scan lengths are not equal, whether the combination of the image data are to be terminated or not is determined (step S602). If the combination is to be terminated in the decision of the step S602, the images of pages 1 to n are recorded on one record sheet (steps S509 and S510) and the process is terminated. On the other hand, if the combination of the image data is to be continued in the decision of the step S602, whether a minimum main scan length or a maximum main scan length is to be selected is determined (step S603). Namely, whether a smaller one of the main scan length of the record sheet optimum to the n pages of image data and the main scan length of the record sheet optimum to the (n+1) pages of image data is to be selected or not is determined.

When the record sheet of the minimum main scan length is to be selected in the decision of the step S603, the image data is reduced so that it is accommodated in the record sheet of the minimum main scan length (step S604) and the process proceeds to a step S605. On the other hand, when the record sheet of the maximum main scan length is to be selected in the decision of the step S603, namely, when a larger one of the main scan length of the record sheet optimum to the n page of image data and the main scan length of the record sheet optimum to the (n+1) pages of image data is selected, the process proceeds directly to the step S605. If the decision in the step S601 indicates the same main scan length, the process proceeds to the step S605.

In the step S605, whether the resolution of the page n and the resolution of the page (n+1) are equal or not is determined. If the decision in the step S605 indicates the equality, the process proceeds to the step S505, and if the resolutions are not equal, whether the resolutions are unified or not is determined (step S606). If the decision in the step S606 indicates that the resolutions are not to be unified, the process proceeds to the step S505, and if the resolutions are to be unified, the resolutions are converted to the minimum resolution (step S607).

In the above embodiments, the facsimile apparatus has been described. However, the present invention is not limited to the facsimile apparatus but it is also applicable to a filing system for reading a document sheet by a scanner and managing the holding of the read data, wherein a similar process is conducted when the data is outputted and similar effects are attained.

In the above embodiments, the resolution of the image data is converted without regard to the size of the record sheet. Alternatively, the conversion may be made in accordance with the size of the record sheet. For example, when the size of the record sheet is small, the resolution need not be converted into the minimum one, and it may be maintained for the record sheet of the small size.

In the above embodiments, when the record sheet of the minimum main scan length is selected, the image data is reduced. Alternatively, when the record sheet of the maximum scan length is selected, the image data may be enlarged. Thus, the main scan lengths of the image data may be unified when the record sheet of the maximum main scan length is selected.

In either case of the reduction and the enlargement, the positioning such as left side alignment, right side alignment or centering may be conducted. Thus, the recording may be made in a form demanded by a user.

The present invention may be applied to a system comprising a plurality of equipments or a system comprising a single equipment. The present invention may also be applied to a case where it is achieved by supplying a program to the system or the apparatus. In this case, a storage medium which stores a program represented by software for attaining the present invention may be read into the system or the apparatus so that the system or the apparatus may enjoy the effect of the present invention.

What is claimed is:

1. A recording apparatus comprising:

input means for inputting data of a plurality of pages;

record means capable of using record sheets of a plurality of record sheet sizes for recording the input data on the record sheets;

first detection means for detecting a size of input data;

second detection means for detecting a size of combined data having a plurality of pages of input data combined;

first determination means for determining the record sheet size to be used in accordance with the size detected by said first detection means;

second determination means for determining the record sheet size to be used in accordance with the combination size detected by said second detection means; and control means for controlling said record means to record the combined data on the record sheet of the record sheet size determined by said first determination means, when the record sheet size determined by said second determination means is equal to the record sheet size determined by said first determination means.

2. A recording apparatus according to claim 1 wherein said input means is receiving means.

3. A recording apparatus according to claim 1 wherein said input means is read means for reading a document sheet.

4. A recording apparatus according to claim 1 further comprising storage means for storing data inputted from said input means, said second detection means detecting the size of the combined data having a plurality of pages of data stored in said storage means combined.

5. A recording apparatus according to claim 1 wherein said data is image data.

6. A recording apparatus according to claim 1 wherein said recording apparatus is a facsimile apparatus.

7. A control method for controlling a recording apparatus capable of using record sheets of a plurality of record sheet sizes, comprising:

an inputting step for inputting data of a plurality of pages;

a first detecting step for detecting a size of input data;

a second detecting step for detecting a combination size of combined data having a plurality of pages of input data combined;

a first determining step for determining a record sheet size to be used in accordance with the size detected in said first detecting step;

a second determining means for determining a record sheet size to be used in accordance with the combination size detected in said second detecting step; and a recording step for recording the combined data on the record sheet of the record sheet size determined in said first determining step, when the record sheet size determined in said second determining step is equal to the record sheet size determined in said first determining step.

8. A method according to claim 7 wherein said input data is received data.

9. A method according to claim 7 wherein said input data is read data derived by reading a document sheet.

10. A method according to claim 7 further comprising:
a storing step storing said input data, and said second detecting step detecting a size of the combined data having a plurality of pages of stored data combined.

11. A method according to claim 7 wherein said data is image data.

12. A method according to claim 7 wherein said control method is a facsimile apparatus control method.

13. An apparatus according to claim 1, wherein said control means causes said record means to record the combined data when the record sheet size determined by said second determination means is equal to that determined by said first determination means for a leading one of the plurality of pages of input data combined.

14. An apparatus according to claim 1, wherein said control means causes said record means to record the combined data when the record sheet size determined by said second determination means is equal to that determined by said first determination means for each of the plurality of pages of input data combined.

15. A recording apparatus, comprising:
input means for inputting data of a plurality of pages;
record means capable of selectively using record sheets of a plurality of record sheet sizes;
determination means for determining the record sheet size on the basis of a size of data of a first page inputted through said input means; and
discrimination means for comparing the record sheet size determined by said determination means with a size of combined data having the first page and subsequent pages as inputted data, and discriminating whether or not the combined data can be recorded on the determined record sheet size in accordance with a result of the comparison,
wherein when said discrimination means discriminates that the combined data can be recorded on the determined record sheet size, said record means records the combined data on a record sheet of the determined record sheet size.

16. An apparatus according to claim 15, further comprising setting means for setting a maximum number of combinations, wherein as far as a number of combinations is not less than the maximum number set by said setting means, said discrimination means repeats its comparison operation in such a manner that in a case that the combined data can be recorded on the determined record sheet size, a size of combined data having the combined data and data of a subsequent page further combined is repeatedly compared with the determined record sheet size until thus combined data cannot be recorded on the determined record sheet size.

17. An apparatus according to claim 15, wherein said input means is a receiving means.

18. An apparatus according to claim 15, wherein the data is image data.

19. An apparatus according to claim 15, wherein said recording apparatus is a facsimile apparatus.

20. A recording apparatus, comprising:
input means for inputting data;
record means selectively capable of using record sheets of a plurality of record sheet sizes;
detection means for detecting a resolution of data inputted through said input means;
resolution converting means for performing resolution conversion so as to unify resolutions of input data of a plurality of pages when resolutions of the input data of a plurality of pages detected by said detection means are different; and
control means for combining the input data of a plurality of pages as resolution-converted data converted by said resolution converting means and controlling said record means to record thus combined data.

21. An apparatus according to claim 20, wherein said control means compares a size of the input data of a plurality of pages with a size of a record sheet and, based on the result of the comparison, combines the input data of a plurality of pages when combined input data of a plurality of pages can be recorded on the record sheet.

22. An apparatus according to claim 20, wherein said input means is a receiving means.

23. An apparatus according to claim 20, wherein the data is image data.

24. An apparatus according to claim 20, wherein said recording apparatus is a facsimile apparatus.

25. A method according to claim 7, wherein the combined data is recorded on the record sheet of the determined record sheet size when the record sheet size determined in said second determining step is equal to the record sheet size determined in said first determining step for a leading one of the plurality of pages of input data combined.

26. A method according to claim 7, wherein the combined data is recorded on the record sheet of the determined record sheet size when the record sheet size determined in said second determining step is equal to the record sheet size determined in said first determining step for each of the plurality of pages of input data combined.

27. A method for recording on record sheets having a plurality of sizes, comprising:
an inputting step for inputting data of a plurality of pages;
a determining step for determining a record sheet size on the basis of a size of data of a first page inputted in said inputting step;
a discriminating step for comparing the record sheet size determined in said determining step with a size of combined data having the first page and subsequent pages as inputted data, and discriminating whether or not the combined data can be recorded on the determined record sheet size in accordance with a result of the comparison;
a recording step for selectively using record sheets of the plurality of record sheet sizes, and recording the combined data on a record sheet of the record sheet size determined in said determining step when a discrimination is made in said discriminating step that the combined data can be recorded on the determined record sheet size.

28. A method according to claim 27, further comprising a setting step for setting a maximum number of combinations, wherein as far as a number of combinations is not less than the maximum number set in said setting step, the comparison in said discriminating step is repeated in such a manner that in a case that the combined data can be recorded on the determined size of record sheet, a size of combined data having the combined data and data of a subsequent page further combined is repeatedly compared with the determined size of record sheet until thus combined data cannot be recorded on the determined record sheet size.

29. A method according to claim 27, wherein said inputting step receives data over a communication line.

30. A method according to claim 27, wherein the data received in said inputting step is image data.

31. A method according to claim 27, wherein said recording step is performed in a facsimile apparatus.

32. A controlling method for controlling a recording apparatus capable of using record sheets of a plurality of record sheet sizes, said method comprising:

an inputting step for inputting data;

a detecting step for detecting a resolution of data inputted in said inputting step;

a resolution converting step for performing resolution conversion so as to unify resolutions of input data of a plurality of pages when resolutions of the input data of a plurality of pages detected in said detecting step are different, and combining the input data of a plurality of pages as resolution-converted data; and a recording step for selectively using record sheets of the plurality of record sheet sizes to the resolution-converted data.

33. A method according to claim 32, further comprising a comparing step for comparing a size of the input data of a plurality of pages with a size of a record sheet and, based on the comparison, combining the input data of the plurality of pages when combined input data of a plurality of pages can be recorded on the record sheet.

34. A method according to claim 32, wherein said inputting step receives data from communication lines.

35. A method according to claim 32, wherein the data is image data.

36. A method according to claim 32, wherein said recording step is performed in a facsimile apparatus.

\* \* \* \* \*

UNITED STATES PATENT AND TRADEMARK OFFICE
CERTIFICATE OF CORRECTION

PATENT NO. : 5,959,744

DATED : September 28, 1999

INVENTOR(S): SHINICHIRO KOHRI, ET AL.

It is certified that error appears in the above-identified patent and that said Letters Patent is hereby corrected as shown below:

COLUMN 4:

Line 18, change "are combined" to --combined--.

COLUMN 5:

Line 31, "is recorded" should read --are recorded--.

Signed and Sealed this

Fourteenth Day of November, 2000

Attest:

Q. TODD DICKINSON

*Attesting Officer*          Director of Patents and Trademarks